Jan. 26, 1971   M. D. EASI   3,559,056
ELECTRICAL TESTING ARRANGEMENT INCLUDING PROBE HAVING
PIVOTABLE PROBE CONTACT ELEMENTS
Filed Jan. 9, 1968
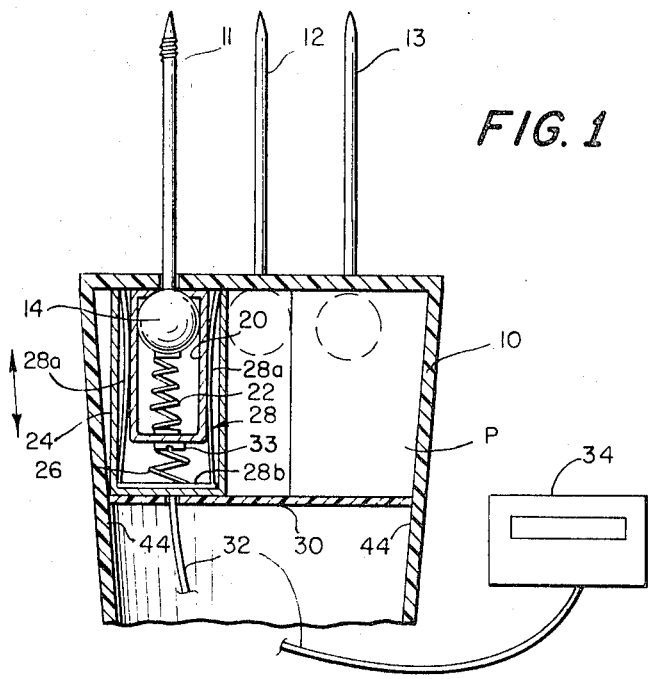
FIG. 1
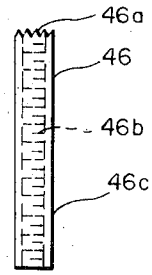
FIG. 2
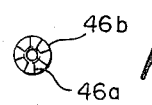
FIG. 3
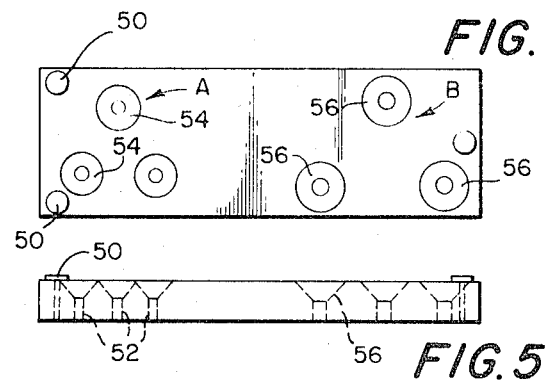
FIG. 4
FIG. 5
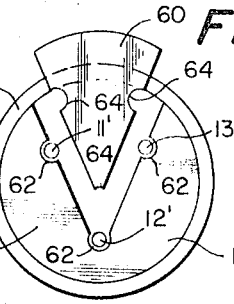
FIG. 6
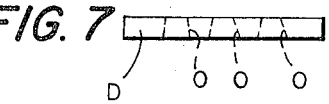
FIG. 7
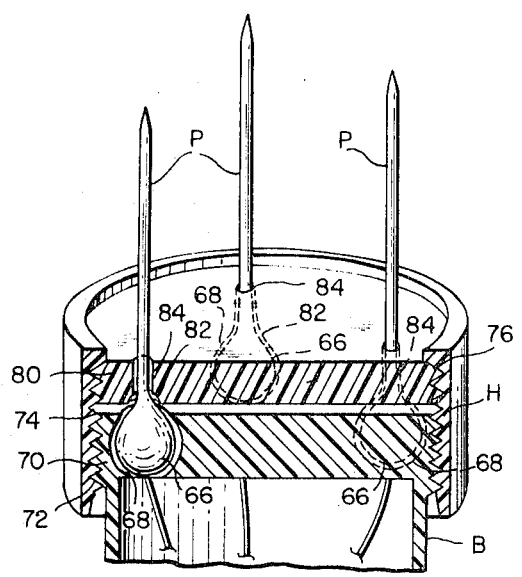
FIG. 8
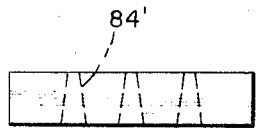
FIG. 9
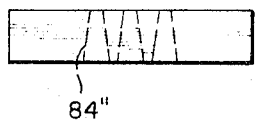
FIG. 10
INVENTOR
MICHAEL D. EASI
BY Larson and Taylor
ATTORNEYS United States Patent Office 3,559,056
Patented Jan. 26, 1971

3,559,056
ELECTRICAL TESTING ARRANGEMENT INCLUD-
ING PROBE HAVING PIVOTABLE PROBE CON-
TACT ELEMENTS
Michael D. Easi, Philadelphia, Pa., assignor to VIMM
Research Development Corporation, Philadelphia, Pa.
Continuation-in-part of application Ser. No. 669,127,
Sept. 20, 1967. This application Jan. 9, 1968, Ser.
No. 696,619
Int. Cl. G01r 31/02
U.S. Cl. 324—72.5
10 Claims

ABSTRACT OF THE DISCLOSURE

An electrical testing arrangement is provided which includes a testing probe wherein the spherical base portions of a series of pivotable contact elements are each received in a metallic mounting cylinder containing a coil spring providing resilient support. The cylinders themselves are each supported within a cylindrical space by a further coil spring. Leaf springs located in this space provide for lateral movement of the cylinders. A number of probe guides for setting or fixing the positions of the contact elements are described.

This application is a continuation-in-part of my earlier filed U.S. patent application Ser. No. 669,127, filed Sept. 20, 1967.

The present invention relates to electrical probes and more particularly to guides for setting the positions of the contact elements of an electrical probe.

In my earlier filed U.S. patent application Ser. No. 669,127, filed Sept. 20, 1967, I disclosed an electrical probe wherein the contact elements, i.e., the probe pins, were laterally adjustable whereby test components of various configurations and sizes could be tested without being removed from the circuit. So-called "in-circuit" testing is generally preferable to testing where the test components are removed from the circuit but presents special testing problems as described in the earlier application. One of the most important of these problems is that different sized elements present test contact points of different spacings and thus a probe wherein the relative positions of the contact pins are fixed may be suitable for use with components of one size but not with components of a substantially different size.

Although the probe of my earlier filed application has proved to be satisfactory there are circumstances where it is preferable that the probe contact elements be adjustable to particular positions corresponding to the specific configuration of the test element. For example, under assembly line conditions where a great number of test components having a characteristic configuration of test elements to be contacted are to be tested it is generally advantageous to use a probe in the contact pins which are suitably set for testing that particular configuration. Although the probe of my earlier application may, of course, be used under these conditions, there may be a tendency, because the positions of the probe pins are adjustable, for these pins to "wander" from the desired setting and thus require re-setting. On the other hand, it would obviously be quite expensive to keep on hand a different probe for every configuration or spacing of contact elements likely to be encountered.

In accordance with a presently preferred embodiment of the invention, an electrical testing arrangement is provided which includes a testing probe having a plurality of pivotable contact elements extending outwardly therefrom. The spherical base portions of the pivotable contact elements are each received in a metallic mounting cylinder which contains a coil spring for providing resilient support. The mounting cylinders are each supported within a cylindrical space by a further coil spring and electrical conductors connected to the further coil spring are used in connecting the contact elements to testing means. The arrangement may include leaf springs located in the mounting space for the cylinders which provide lateral movement of the cylinders within this space.

In accordance with one feature of the present invention guide or positioner means are provided whereby the laterally adjustable probe pins are set or fixed in a particular desired relationship. In accordance with the invention in perhaps its simplest form, a guide plate is provided having a number of groups of holes located therein, the holes being spaced corresponding to the spacing of the contact elements of the various test components. By simply inserting the probe pins into the configuration of holes corresponding the component to be tested the pins may be rapidly set to the appropriate positions.

In accordance with a further feature of the invention guide means are provided which both set and fix the positions of the probe pins. In accordance with perhaps the simplest form of this aspect of the invention a wafer or disc member having a plurality of holes therein of predetermined spacing is fitted over or around the probe pins to fix the position thereof. In accordance with yet another embodiment a wafer element similar to that described hereinbefore may be screwed into a threaded probe head which fits over a probe body mounting the adjustable probe pins.

Other features and advantages of the present invention will become apparent upon consideration of the following description of the drawings, wherein:

FIG. 1 is a front view, partially in section, of a first embodiment of the invention, FIGS. 2 and 3 are front and top views, respectively, of a replaceable probe usable with the embodiment of FIG. 1, FIGS. 4 and 5 are top and side views, respectively, of a further embodiment of the invention, FIGS. 6 and 7 are top and side views, respectively, of another embodiment of the invention, FIG. 8 is a perspective view, partially in section, of yet another embodiment of the invention, FIGS. 9 and 10 are side views of positioning, members usable in the embodiment of FIG. 8.

Referring to FIG. 1 of the drawing, a probe P comprising a probe body 10 having a plurality of probe pins 11, 12 and 13 extending outwardly therefrom is shown. The probe P of FIG. 1 is similar to that shown in my earlier filed application Ser. No. 669,127 and differs generally in the manner in which probe pins 11 to 13 are mounted.

The mounting means for pins 11 to 13 are generally the same and thus only the mounting means for pin 11 will be described in detail. Pin 11 includes a ball-shaped member 14 located at the lower end thereof which is seated in an opening in the upper end of a metallic support cylinder 20. Ball member 14 is actually supported by a flexible metallic tube spring 22 which forces ball 14 against the undersurface of the portion of cylinder 20 forming the end opening. Ball member 14 also contacts the inner walls of cylinder 20 and is free to pivot within the seating provided by these inner walls and the undersurface of the upper portion of cylinder 20, and by the spring 22. Cylinder 20 is itself supported within a further metallic cylinder 24 by means of a flexible metallic tube spring 26. As can be seen in FIG. 1 there is a slight lateral clearance space between the cylinders 20 and 24. The lateral position of cylinder 20 is determined by a four-armed leaf spring 28 which contacts the cylinder 20 at four equally spaced locations about the circumference of the cylinder. Leaf spring 28 includes a base member 28b which may be fixedly attached to the interior wall of cylinder 24 and four arms 28a (two of which are shown) extending upwardly and outwardly from base member 28b. Cylinder 24, along with similar cylinders included in the mounting means for probes 12 and 13, may be mounted within probe body 10 by any suitable support means such as a support disc 30 as shown. A connecting lead 32 is soldered to the base of the cylinder 24 and connects probe pin 11 to suitable metering generally denoted 34 in FIG. 1. Probe pins 12 and 13 are similarly connected to metering 34.

It will be appreciated that probe pin 11 (and similarly probe pins 12 and 13) are free to move longitudinally as well as laterally. As in my earlier application the pivotable joint formed by ball member 14 permits lateral movement of pin 11 such that contact points of different spacings may be contacted thereby. Further, slight lateral movement is afforded by the clearance between cylinders 20 and 24 and by the flexible positioning provided by leaf spring 28. It is noted that this further slight lateral movement capability is similar to that afforded by the flexible tube support member of my earlier application. The means including spring 28 described hereinabove for accomplishing this effect may be superior to the corresponding means disclosed in my earlier application from the standpoint of facility of production, the means of the present invention being generally easily to produce.

A tensioning screw 33 located at the base of cylinder 20 may be used to increase or decrease the tension of spring 22 and thereby vary the "stiffness" of the probe pins 11 to 13.

As stated above, under certain conditions such as the testing of great numbers of mass produced devices it may be desired that the locations of the probe pins 11 to 13 be set for a particular test. With the pins set, the same test can be conducted rapidly and repeatedly without having to adjust the positions of the pins. Where the pins are free to move there always exists the possibility of the pins "wandering" from the desired setting and thus requiring tedious manual re-setting.

Referring to FIGS. 2 and 3, a special probe element 46 is shown which, as set forth in the earlier filed application, may be utilized in place of any of probe pins 11 to 13. Probe element 46 includes a plurality of teeth 46a located on the upper end thereof and a central bore 46b extending through the body of the element. In use, the probe 46 may be positioned to surround an upright contact point such as those used in certain transformers, the upright contact point fitting into central bore 46b. The sawtooth end structure provides good contact with a lower portion (or the base) of the upright contact point.

The lower end of probe element 46 is threaded internally as indicated at 46c so that the probe may be screw-mounted on the existing pointed probe elements 11 to 13. Probe elements 11–13 are provided with corresponding screw threads (threads 11a being shown in FIG. 1) which may be screwed into the internal threading 46c of probe element 46. It is noted that variations of the arrangement shown are possible, for example, the probe elements like element 46 with suitable modification may be utilized as the main probe elements in place of elements 11 to 13. With this arrangement, pointed probe elements similar to elements 11 to 13 may be screw fitted into internal threading provided of the upper end of the modified probe elements corresponding to elements 46. It is noted that with either arrangement, the probe elements fitted onto or into the main or base elements may be simply force fit thereon or may be fitted thereon by other means.

FIGS. 4 and 5 illustrate perhaps the simplest form of guide or positioning means for the probe elements 11 to 13. FIGS. 4 and 5 show a plate or slab 48 constructed, for example, of metal and bolted through means of bolts 50 to a bench or the like (not shown). Plate 48 contains a plurality of groups, A and B, of openings by holes of predetermined spacing formed therein. Group A comprises three holes 54 arranged in a triangular configuration as shown in FIG. 4 while group B comprises three holes 56 arranged to form a somewhat larger triangle. The spacings of holes 54 and holes 56 may correspond to two different transistors having different test contact spacings. In use with transistors for example, probles 11 to 13 are inserted into whichever group of holes correspond to the transistor under test and thus the proper spacing of the probe elements may be quickly and easily realized. It is noted that the upper ends of the holes 52 and 54 are beveled so that the holes are funnel-shaped and thus the probe elements may be readily inserted therein. The holes need not be of any great depth in that only the ends of the probe elements need be inserted therein. It will be appreciated that the plate 48 may include any number of groups of holes having different spacings corresponding to different elements to be tested and that the groups need not necessarily consist of three holes. As set forth in my earlier application the probe elements may be made to be removable and thus various groups corresponding to groups A and B might, for example, comprise two holes of different spacings according to various diode sizes. It will be appreciated that the embodiment of FIGS. 4 and 5 merely provides setting of the positions of the probe elements but does not fix these positions. For this reason this embodiment is particularly useful where the probe elements are "stiff," i.e., relatively hard to move, and thus remain in the set position although because positioning of the probe elements may be accomplished so rapidly and easily the embodiment has utility even with probe elements which may be moved relatively freely.

FIGS. 6 and 7 illustrate an embodiment wherein means are provided for both setting and fixing the positions of the probe elements. This means takes the form of a disc or wafer D preferably constructed of plastic and composed of infitting pieces 58 and 60. In use, disc D is fitted on the end of a probe body 10' as shown and rests on the upper surface thereof. Disc piece 58 has a pie-shaped section removed therefrom and includes a three part-circular recesses 62 located at spaced distances about the perimeter of the disc D adjacent the removed section as shown in FIG. 6. The upper two recesses 62 are generally semi-circular in shape while the lower recess may be formed with a portion removed generally corresponding to the width of a probe element. Probe elements 11' to 13' are fitted into recesses 62 as shown to establish the relative positions thereof.

To fix these positions, pie-shaped disc piece 60 is snap-fit into the correspondingly shaped vacant section of piece 58 and part-circular recesses 64 formed in piece 60 complete the circular holes or openings O (see FIG. 7) through which the probe elements 11' to 13' extend. As shown in FIG. 7 the holes O are formed with the bottom openings larger than the top openings so that the probe elements may be readily inserted therein. Other discs like disc D may, of course, include openings O of various spacings corresponding to predetermined spacings of test element contact points and may readily be substituted therefor. Spacers like spacer D provide rapid setting and fixing the position of the probe elements and may be cheaply and easily manufactured. It is noted that a two-piece disc in that it is difficult, particularly for settings where the probe elements are closely spaced, to fit a one-piece disc over the pins. In certain instances a one-piece disc may be fitted down only to a location some distance above the upper face of the probe rather than flush therewith.

FIG. 8 shows a further embodiment of the invention wherein the positions of the probe elements are both set and fixed. As was pointed out in my earlier application, a probe in accordance with the invention may be constructed wherein a head member H is screwed onto the end of a probe body B as shown in FIG. 8. The embodiment of FIG. 8 is generally similar to that of FIG. 1 and will only be briefly described. Probe pins P each include a ball shaped base member 66 which seats in semi-spherical recess 68 located in an end portion 70 of probe body B. End portion 70 further includes screw threads 72 which mate with the internal threading 74 provided in the inner surface of a downwardly depending portion of head member H. Head member H is generally cylindrical in shape and includes an annular flange or rim member 76 which extends inwardly to serve as a stop for limiting the travel of the probe assembly including a positioner disc 80 described hereinbelow.

The setting and fixing means of the embodiment of FIGS. 8–10 comprises a disc member 80 which may also be screwed into head member H. Disc member 80 rests upon the upper surface of end portion 76 of probe body B and may include a plurality of recesses 82 each of which mate with a corresponding semi-spherical recess 68 of probe body B to form a spherical seating for a respective ball member 66. Disc member 80 further includes a plurality of holes or openings 84 which are adapted to receive the probe pins P. As was pointed out in connection with the other embodiments holes 84 will determine and fix the positions of the probe elements P. The probe in accordance with this embodiment may be quickly assembled by merely fitting the positioner disc member 80 over the probe elements P and then screwing the disc member 80 and probe body B into probe head H. It is noted that disc member 80 need not be threaded in that its position will be fixed when probe body B is screwed into head H.

To set and fix the probe elements P in different positions a number of disc members like member 80 but having different spacings of the probe-receiving holes 84 may be utilized (see FIGS. 9 and 10). As can be seen in these FIGS. 9 and 10 the holes (holes 84' and 84'' being shown in these figures) are shaped such that the lower opening is larger than the upper opening so that easy insertion of the probe elements P may be effected. It should be noted that the probe device of FIG. 8 is preferably constructed to operate without the presence of spacer elements and thus the recesses 68 are preferably made deep enough such that they will support and retain ball members 66 by themselves. Other variations on this arrangement are, of course, possible. It is further noted that the disc member 80 may be of a two-piece construction similar to disc D of FIGS. 4 and 5.

Having thus described the invention in the manner required by the patent statutes, I wish it to be understood that the foregoing disclosure is illustrative rather than definitive, and that the scope of the invention is defined by the subjoined claims interpreted in the light of the specification and drawing.

I claim:
1. An electrical testing arrangement comprising a probe body, a plurality of laterally positionable contact members extending outwardly of said probe body, each said contact member comprising an elongate contact element and a substantially spherical base member, supporting means for supporting each said contact member comprising a generally cylindrical conductive member for receiving said spherical base member therein and including means for defining an opening through which the associated said contact element extends, and coil spring means located within said cylindrical member for resiliently supporting said spherical member against said opening defining means, further coil spring means for resiliently supporting said cylindrical member within said probe body, means defining a generally cylindrical interior space in which said cylindrical member and said further coil spring means are mounted, and connector means electrically connected to said further coil spring means for connecting said contact member to testing means.

2. An arrangement as claimed in claim 1 wherein said supporting means further comprises a further spring means for resiliently supporting each said cylindrical member so as to permit lateral movement thereof.

3. An arrangement as claimed in claim 2 wherein said further spring means each comprise leaf spring means mounted within a respective said interior space.

4. An arrangement as claimed in claim 1 further comprising further contact means interfitting with said elongate elements for modifying the contact surface presented by said elements.

5. An arrangement as claimed in claim 2 further comprising positioning means including a member having a plurality of holes of predetermined spacing located therein for receiving said laterally positionable contact members and thereby setting the positions thereof.

6. An arrangement as claimed in claim 5 wherein said positioning means comprises a flat member separate from said probe body, said flat member containing a plurality of groups of said holes of predetermined spacing.

7. An arrangement as claimed in claim 5 wherein said positioning means comprises a set of positioning members each having holes therein of a different predetermined spacing.

8. An arrangement as claimed in claim 5 wherein said positioning means includes a disc-like member located at the end of said probe body.

9. An arrangement as claimed in claim 8 wherein said disc-like member comprises first and second members, said first member snap-fitting into said second member to form the complete member and to form a plurality of holes of predetermined spacing.

10. An arrangement as claimed in claim 8 wherein said probe body includes a separable probe head and means for fitting said probe body into said probe head to capture said disc-like spacer between said probe head and the end of said probe body.

References Cited
UNITED STATES PATENTS

| 2,981,919 | 4/1961 | Lamont | 324—158UX |
| 3,239,760 | 3/1966 | Schweitzer | 324—158 |
| 3,445,766 | 5/1969 | Valliere | 324—72.5 |

FOREIGN PATENTS

| 1,080,941 | 8/1967 | Great Britain | 324—72.5 |

RUDOLPH V. ROLINEC, Primary Examiner
R. J. CORCORAN, Assistant Examiner

U.S. Cl. X.R.
339—64